US010122035B2

(12) United States Patent
Hasegawa et al.

(10) Patent No.: US 10,122,035 B2
(45) Date of Patent: Nov. 6, 2018

(54) FUEL CELL SYSTEM

(71) Applicant: TOYOTA JIDOSHA KABUSHIKI KAISHA, Toyota-shi, Aichi-ken (JP)

(72) Inventors: Shigeki Hasegawa, Toyota (JP); Masashi Toida, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 1 day.

(21) Appl. No.: 15/608,955

(22) Filed: May 30, 2017

(65) Prior Publication Data

US 2018/0026287 A1   Jan. 25, 2018

(30) Foreign Application Priority Data

Jul. 25, 2016 (JP) .................................. 2016-145217

(51) Int. Cl.
*H01M 8/04* (2016.01)
*H01M 8/04746* (2016.01)
(Continued)

(52) U.S. Cl.
CPC ..... *H01M 8/04746* (2013.01); *H01M 8/0438* (2013.01); *H01M 8/04559* (2013.01); *H01M 8/04753* (2013.01)

(58) Field of Classification Search
CPC ......... H01M 8/04537; H01M 8/04544; H01M 8/04664; H01M 8/04694; H01M 8/04701;
(Continued)

(56) References Cited

U.S. PATENT DOCUMENTS

2008/0182138 A1* 7/2008 Salvador ........... H01M 8/04164
  429/429
2015/0207158 A1* 7/2015 Nanba ................ H01M 8/04119
  429/442

FOREIGN PATENT DOCUMENTS

JP   2004-152532 A   5/2004
JP   2016-054056 A   4/2016

* cited by examiner

*Primary Examiner* — Anthony R. Jimenez
(74) *Attorney, Agent, or Firm* — Dickinson Wright, PLLC

(57) ABSTRACT

A fuel cell system, comprising: a fuel cell stack configured to include a plurality of cells; a number "n" of injectors arranged in parallel to supply an anode gas to the fuel cell stack, where the number "n" represents an integral number of not less than 2; a cell voltage meter configured to measure a voltage of at least one cell among the plurality of cells; a pressure gauge configured to measure a supply pressure that is a pressure of the anode gas supplied to the fuel cell stack; and a controller configured to respectively input control signals into the number "n" of injectors by using the voltage measured by the cell voltage meter and the supply pressure measured by the pressure gauge and to control a driving number that denotes a number of injectors to be driven among the number "n" of injectors, wherein when the measured voltage is equal to or higher than a predetermined voltage value, the controller is configured to set a target value of the supply pressure and the driving number according to a required electric power, when the measured voltage is lower than the predetermined voltage value, the controller is configured to perform a first control that fixes the driving number to the number "n" while setting a target value for purging that is a higher value than the target value according to the required electric power to the target value of the supply pressure, and when the supply pressure reaches the target value for purging by the first control, the controller is (Continued)

configured to perform a second control that cancels fixation of the driving number while continuing setting the target value for purging to the target value of the supply pressure.

13 Claims, 9 Drawing Sheets

(51) Int. Cl.
*H01M 8/0438* (2016.01)
*H01M 8/04537* (2016.01)

(58) Field of Classification Search
CPC ......... H01M 8/04746; H01M 8/04768; H01M 8/047858; H01M 8/0488; H01M 8/04951; H01M 8/24; H01M 10/48; H01M 10/486; H01M 10/60; H01M 10/63; H01M 8/0438; H01M 8/04559; H01M 8/04753; H01M 8/04007; H01M 8/04029; H01M 8/04014; H01M 8/04082; H01M 8/04089; H01M 8/04223; H01M 8/0432; H01M 8/04358; H01M 8/04417; H01M 8/04388; H01M 8/04402; H01M 8/02; H01M 8/04; H01M 8/0267; Y02E 60/521
USPC ........................................................ 429/432
See application file for complete search history.

FUEL CELL SYSTEM

BACKGROUND

Field

The present disclosure relates to purging of a fuel cell.

Related Art

JP 2016-054056A discloses a fuel cell system configured to purge an anode when it is determined that poor power generation occurs in a fuel cell stack. The fuel cell system disclosed in JP 2016-054056A is configured to include three injectors provided to supply hydrogen gas to the fuel cell stack. The fuel cell system disclosed in JP 2016-054056A uses these three injectors to purge the anode.

The prior art configuration described above uses the three injectors to supply hydrogen during purging of the anode. This configuration accordingly increases the noise and thereby reduces the quietness.

By taking into account the foregoing, an object of the present disclosure is to suppress the reducing quietness during purging of the anode.

SUMMARY

In order to solve at least part the problems described above, the disclosure may be implemented by aspects described below.

According to one aspect of the disclosure, there is provided a fuel cell system. This fuel cell system comprises a fuel cell stack configured to include a plurality of cells; a number "n" of injectors arranged in parallel to supply an anode gas to the fuel cell stack, where the number "n" represents an integral number of not less than 2; a cell voltage meter configured to measure a voltage of at least one cell among the plurality of cells; a pressure gauge configured to measure a supply pressure that is a pressure of the anode gas supplied to the fuel cell stack; and a controller configured to respectively input control signals into the number "n" of injectors by using the voltage measured by the cell voltage meter and the supply pressure measured by the pressure gauge and to control a driving number that denotes a number of injectors to be driven among the number "n" of injectors. When the measured voltage is equal to or higher than a predetermined voltage value, the controller is configured to set a target value of the supply pressure and the driving number according to a required electric power. When the measured voltage is lower than the predetermined voltage value, the controller is configured to perform a first control that fixes the driving number to the number "n" while setting a target value for purging that is a higher value than the target value according to the required electric power to the target value of the supply pressure. When the supply pressure reaches the target value for purging by the first control, the controller is configured to perform a second control that cancels fixation of the driving number while continuing setting the target value for purging to the target value of the supply pressure.

DESCRIPTION OF EMBODIMENTS

Figure 1:
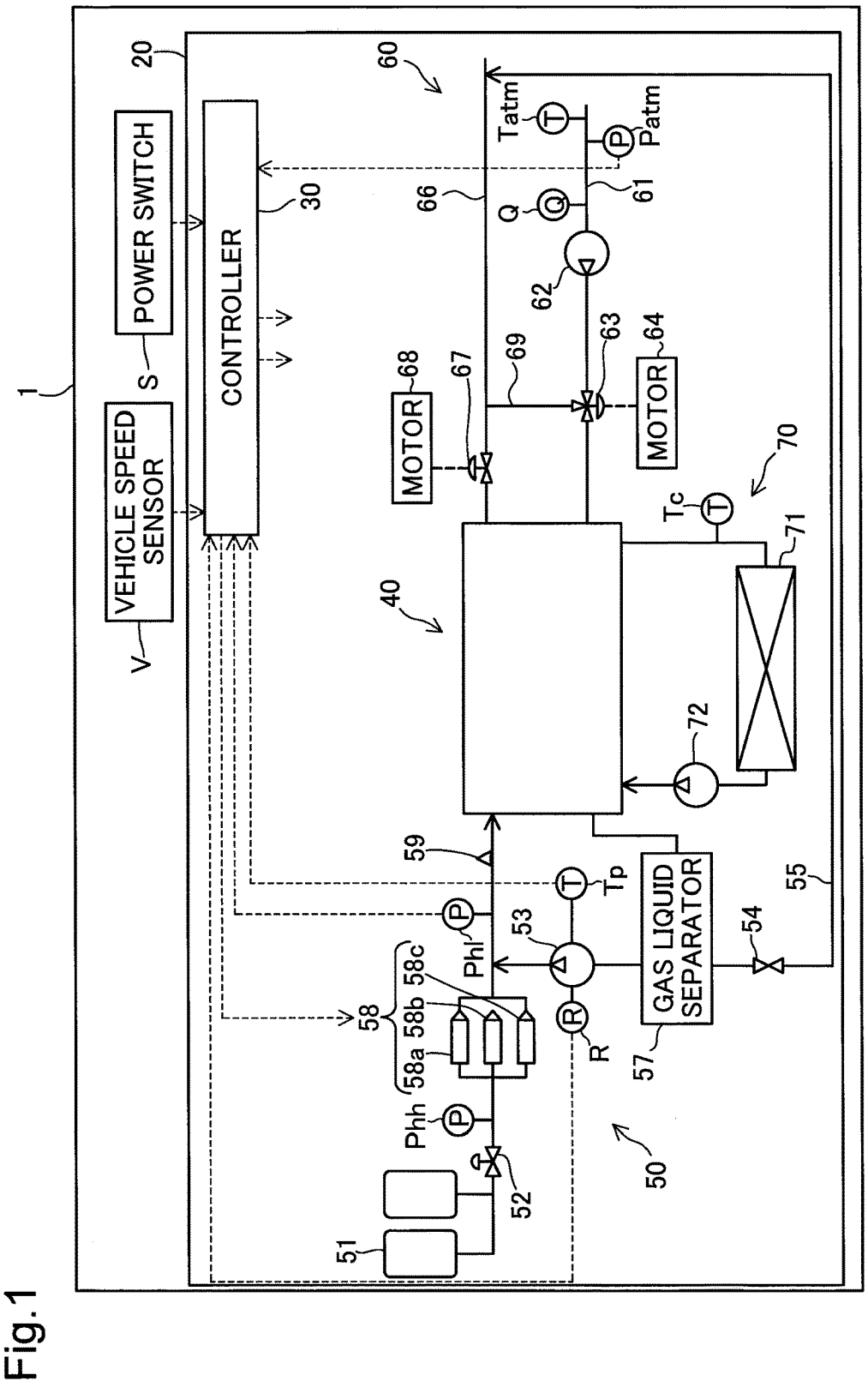
FIG. 1 is a block diagram illustrating the schematic configuration of a fuel cell system.

FIG. 1 is a block diagram illustrating the schematic configuration of a fuel cell system 20. The fuel cell system 20 is mounted on a motor vehicle 1. The motor vehicle 1 is configured to include a power switch S and a vehicle speed sensor V. The power switch S corresponds to an ignition switch of an engine automobile and serves as an input interface to change over between the parking state and the drivable state of the motor vehicle 1. The vehicle speed sensor V is configured to generate a vehicle speed signal that indicates the vehicle speed of the motor vehicle 1.

The fuel cell system 20 employs a polymer electrolyte fuel cell to generate electric power by a reaction of an anode gas with a cathode gas. The anode gas is hydrogen. The cathode gas is oxygen included in the air. As shown in FIG. 1, the fuel cell system 20 includes a fuel cell stack 40, a hydrogen supply discharge mechanism 50, an air supply discharge mechanism 60, a cooling water circulation mechanism 70 and a controller 30.

The hydrogen supply discharge mechanism 50 is configured to supply and discharge hydrogen to and from anodes of the fuel cell stack 40 and includes a hydrogen tank 51, a regulator 52, a hydrogen pump 53, a drainage shutoff valve 54, a discharge pathway 55, a gas liquid separator 57, three injectors 58a, 58b and 58c, a relief valve 59, a high pressure-side pressure gauge Phh, a low pressure-side pressure gauge Phl, a temperature gauge Tp and a resolver R. The three injectors 58a, 58b and 58c are manufactured to have the same specifications and are arranged in parallel to one another. In the description below, the three injectors 58a, 58b and 58c are collectively referred to as injector 58.

The hydrogen tank 51 is provided to store hydrogen. The regulator 52 is configured to regulate the pressure of the hydrogen stored in the hydrogen tank 51. The hydrogen of the regulated pressure is supplied to the injector 58. The injector 58 is configured to inject the supplied hydrogen toward the anodes under control of the controller 30. The pressure of hydrogen prior to the inflow into the fuel cell stack 40 (hereinafter referred to as supply pressure) is adjusted by injection control of the injector 58.

This injection control denotes controlling the respective three injectors 58a, 58b and 58c independently. Control of each injector 58 is ON-OFF control of whether injection is to be performed or not to be performed. Each injector 58 is configured to inject hydrogen in response to input of a control signal from the controller 30. In the description below, the injector 58 that receives input of the control signal out of the injectors 58a, 58b and 58c is called driven injector.

The controller 30 is configured to set the number of driven injectors (hereinafter referred to as driving number) according to a target value and a present value of the supply pressure. The controller 30 sets the target value of the supply pressure according to a required electric power. The controller 30 sets the required electric power in response to a request from a load 200 (shown in FIG. 2). When the state where the driving number is 3 continues, a supply pressure that is necessary and sufficient at the time of maximum output of the fuel cell system 20 can be provided.

The gas liquid separator 57 is configured to separate a gas and a liquid that are discharged from the anodes, from each other. The hydrogen pump 53 is configured to resupply the gas separated by the gas liquid separator 57 to the fuel cell stack 40. The gas separated by the gas liquid separator 57 is mainly hydrogen that is discharged without being consumed.

The discharge pathway 55 is a pathway arranged to connect the gas liquid separator 57 with an air discharge flow path 66 (described later) provided in the air supply discharge mechanism 60. The drainage shutoff valve 54 is provided in the discharge pathway 55. The drainage shutoff valve 54 is opened to discharge the liquid separated by the gas liquid separator 57.

The high pressure-side pressure gauge Phh is configured to measure the pressure of hydrogen between the regulator 52 and the injector 58. The low pressure-side pressure gauge Phl is configured to measure the supply pressure. The temperature gauge Tp is configured to measure the temperature of the hydrogen pump 53. More specifically, the temperature gauge Tp is configured to measure the temperature of a motor core built in the hydrogen pump 53. The resolver R is configured to measure the rotation speed of the hydrogen pump 53. More specifically, the resolver R is configured to measure the rotation speed of a motor in the hydrogen pump 53. The relief valve 59 is opened to release hydrogen to the atmosphere when a difference between the supply pressure and the atmospheric pressure reaches a threshold value.

The air supply discharge mechanism 60 is configured to supply and discharge the air to and from the cathodes of the fuel cell stack 40 and includes an air supply flow path 61, a compressor 62, a flow dividing valve 63, a motor for flow dividing valve 64, an air discharge flow path 66, a pressure regulator 67, a motor for pressure regulator 68, a bypass 69, an atmospheric pressure gauge Patm, an ambient temperature gauge Tatm and a flowmeter Q.

The air supply flow path 61 and the air discharge flow path 66 are flow passages respectively arranged to connect the fuel cell stack 40 with their respective open air ports. The compressor 62 is provided in the middle of the air supply flow path 61 and is configured to take in the air from the open air port of the air supply flow path 61 and compress the intake air. The compressor 62 is placed at a location that is nearer to the open air port than the position of connection of the air supply flow path 61 and the bypass 69.

The flow dividing valve 63 is provided on the downstream side of the compressor 62 in the air supply flow path 61 or more specifically between the compressor 62 and the fuel cell stack 40. The flow dividing valve 63 is configured to divide the flow of the air flowing from the compressor 62 into the downstream side of the air supply flow path 61 and the bypass 69. This type of valve is also called three-way valve.

The motor for flow dividing valve 64 is connected with the flow dividing valve 63 and is configured to generate a torque that is used to regulate the opening position of the flow dividing valve 63. The bypass 69 is a flow passage arranged to connect the flow dividing valve 63 with the air discharge flow path 66. The pressure regulator 67 is provided in the air discharge flow path 66. The pressure regulator 67 is configured to regulate the flow passage area of the air discharge flow path 66 according to the opening position. The motor for pressure regulator 68 is connected with the pressure regulator 67 and is configured to generate a torque that is used to regulate the opening position of the pressure regulator 67.

The air passing through the pressure regulator 67 subsequently passes through the position of connection of of the air discharge flow path 66 with the bypass 69 and is discharged through the open air port to the atmosphere.

The flowmeter Q is configured to measure the flow rate of the air taken in by the compressor 62 (hereinafter referred to as intake air). The ambient temperature gauge Tatm is configured to measure the temperature of the intake air. The atmospheric pressure gauge Patm is configured to measure the pressure of the intake air.

The cooling water circulation mechanism 70 is configured to cool down the fuel cell stack 40 and includes a radiator 71, a cooling water pump 72 and a water temperature gauge Tc. The cooling water pump 72 is configured to circulate the cooling water between the fuel cell stack 40 and the radiator 71, in order to control the operation temperature of the fuel cell stack 40. The circulation of cooling water provides heat absorption in the fuel cell stack 40 and heat release in the radiator 71. The water temperature gauge Tc is configured to measure the discharge temperature of the cooling water. The discharge temperature herein denotes a temperature of the cooling water discharged from the fuel cell stack 40 prior to the inflow into the radiator 71.

The controller 30 is specifically implemented by an ECU (electronic control unit). The controller 30 is configured to output signals that are used to control the operations of the fuel cell system 20. For example, the controller 30 outputs signals to the injector 58, such as perform anode purging (described later). The controller 30 uses the measurement value of the low pressure-side pressure gauge Phl in the process of anode purging. The controller 30 also uses the measurement values of the temperature gauge Tp, the resolver R and the atmospheric pressure gauge Patm, such as to set an upper limit value that is employable as a control target value of the supply pressure.

Figure 2:
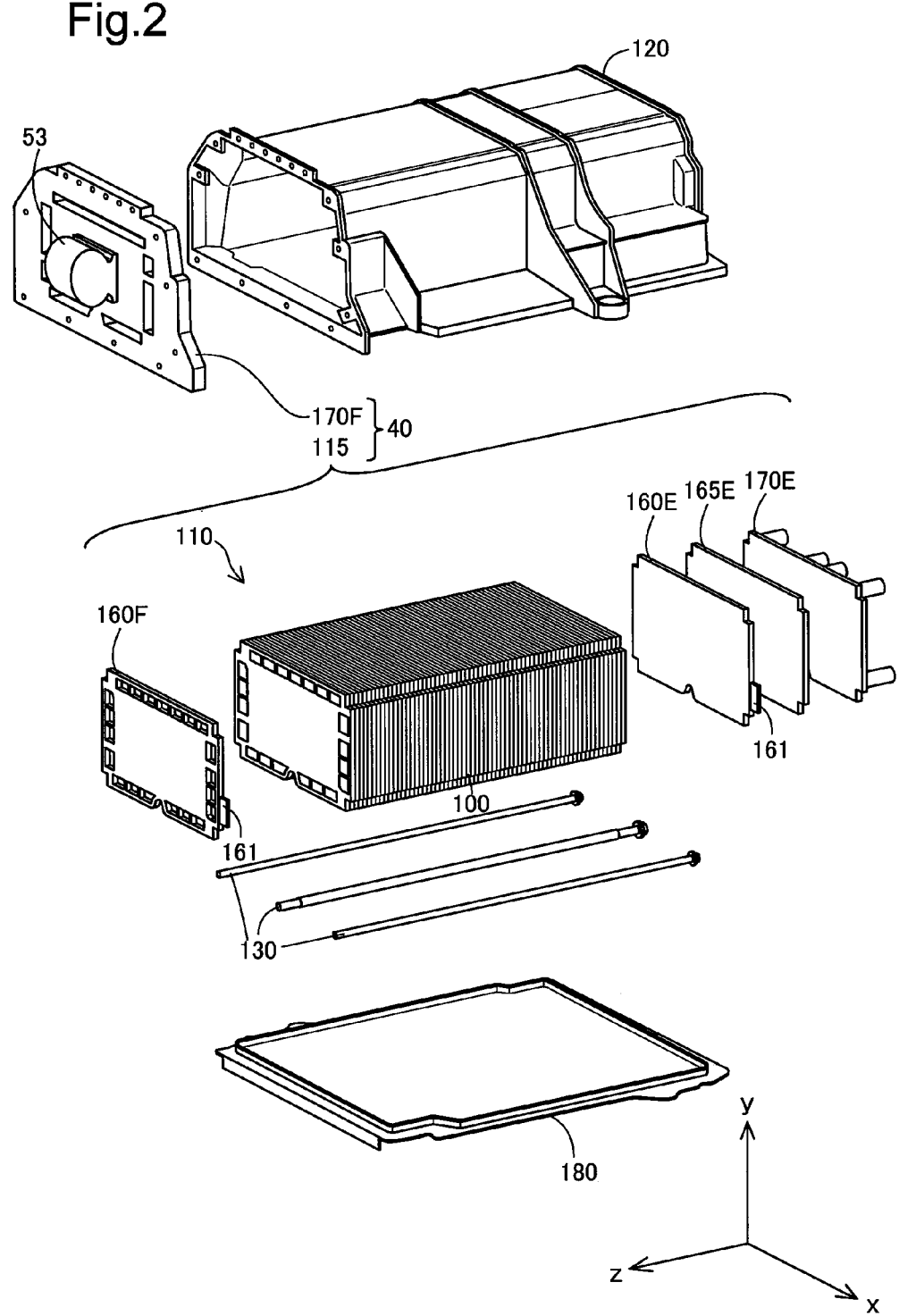
FIG. 2 is an exploded perspective view illustrating a fuel cell stack and fixed components.

FIG. 2 is an exploded perspective view illustrating the fuel cell stack 40 and components fixed to the fuel cell stack 40 (hereinafter referred to as fixed components). All the fixed components are components included in the fuel cell system 20. The fixed components shown in the drawing include the hydrogen pump 53, a case 120, three tension shafts 130 and a cover 180. In the description below, a +z-axis side in FIG. 2 is expressed as front side, a −z-axis side is expressed as rear side, and a −y-axis side is expressed as lower side. A z-axis direction is also called stacking direction.

The fuel cell stack 40 has a layered structure in which a current collector 160F and a front end-side end plate 170F are stacked in this sequence on the front side of a stacked body 110, and a current collector 160E, an insulator plate 165E and a rear end-side end plate 170E are stacked in this sequence on the rear side of the stacked body 110. The stacked body 110 is configured by stacking a plurality of cells 100 (for example, 370 cells) in the stacking direction.

In the description below, the stacked part of the current collector 160F, the stacked body 110, the current collector 160E, the insulator plate 165E and the rear end-side end plate 170E is also called fuel cell main body 115.

The cell 100 includes an anode-side separator (not shown), a cathode-side separator (not shown) and a sealing members-integrated MEA (not shown). MEA is the acronym of membrane electrode assembly.

The cell 100 includes an anode gas supply port, an anode off-gas discharge port, six cathode gas supply ports, seven cathode off-gas discharge ports, three cooling water supply ports and three cooling water discharge ports that are provided in the periphery thereof. In the description below, these supply ports and discharge ports are collectively referred to as "supply/discharge ports".

The supply/discharge ports are connected with respective supply/discharge ports provided in the current collector 160F and the front end-side end plate 170F. When the plurality of cells 100 are stacked, these supply-discharge ports are arranged to form manifolds arranged to supply hydrogen as the anode gas, the air as the cathode gas and the cooling water to the respective cells 100 and manifolds arranged to discharge an anode-off gas, a cathode-off gas and the cooling water from the respective cells 100.

Sealing portions (not shown) are formed around the respective supply/discharge ports described above. The presence of these sealing portions ensures the sealing properties of the manifolds between the separators and between the separator and the current collector 160 in the stacked body of the cells 100.

The current collector 160F and the current collector 160E are configured to collect the electric power generated by the respective cells 100 and output the collected electric power via current collecting terminals 161 to outside. The current collector 160F includes supply/discharge ports that are similar to those provided in the cell 100, in the periphery thereof. The insulator plate 165E is a resin plate having the insulation properties. The front end-side end plate 170F and the rear end-side end plate 170E are made of aluminum.

The front side of the case 120 is open as illustrated. The rear side of the case 120 is closed. The fuel cell main body 115 is placed in the case 120. The front end-side end plate 170F is fixed by means of bolts such as to close the front-side opening of the case 120. Such fixation causes the front end-side end plate 170F to be laid on the current collector 160F.

The tension shafts 130 are placed below the fuel cell main body 115. The tension shaft 130 has the front side that is connected with the front end-side end plate 170F and the rear side that is connected with an end face of the case 120. The bottom side of the case 120 is open and is closed by the cover 180 in the state that the fuel cell main body 115 is placed in the case 120.

The hydrogen pump 53 includes a motor portion and a pump portion, although not being illustrated in detail. The motor portion includes a motor and a motor housing. The pump portion includes a rotor provided to compress hydrogen. The rotor is rotated by the torque of the motor. The controller 30 is configured to send a control signal to the motor, such that the measurement value of the resolver R comes closer to a target value of the rotation speed of the motor (hereinafter referred to as rotation target value).

The hydrogen pump 53 is fixed to the front end-side end plate 170F. In this fixed state, the motor housing of the hydrogen pump 53 is in surface contact with the front end-side end plate 170F. A heat transfer sheet (not shown) is placed between the motor housing and the front end-side end plate 170F. This configuration causes the heat generated in the motor portion to be transferred to the front end-side end plate 170F. As a result, the motor portion has approximately the same temperature as the temperature of the front end-side end plate 170F. As shown in FIG. 2, the front end-side end plate 170F has a larger surface area exposed to outside, compared with the hydrogen pump 53, and is thus likely to release heat. The front end-side end plate 170F accordingly has no significantly elevated temperature. This results in suppressing the motor portion from having an elevated temperature. When the measurement value of the temperature gauge Tp becomes equal to or higher than a threshold value, the controller 30 is configured to stop the operation of the hydrogen pump 53, such as to protect the motor portion.

Figure 3:
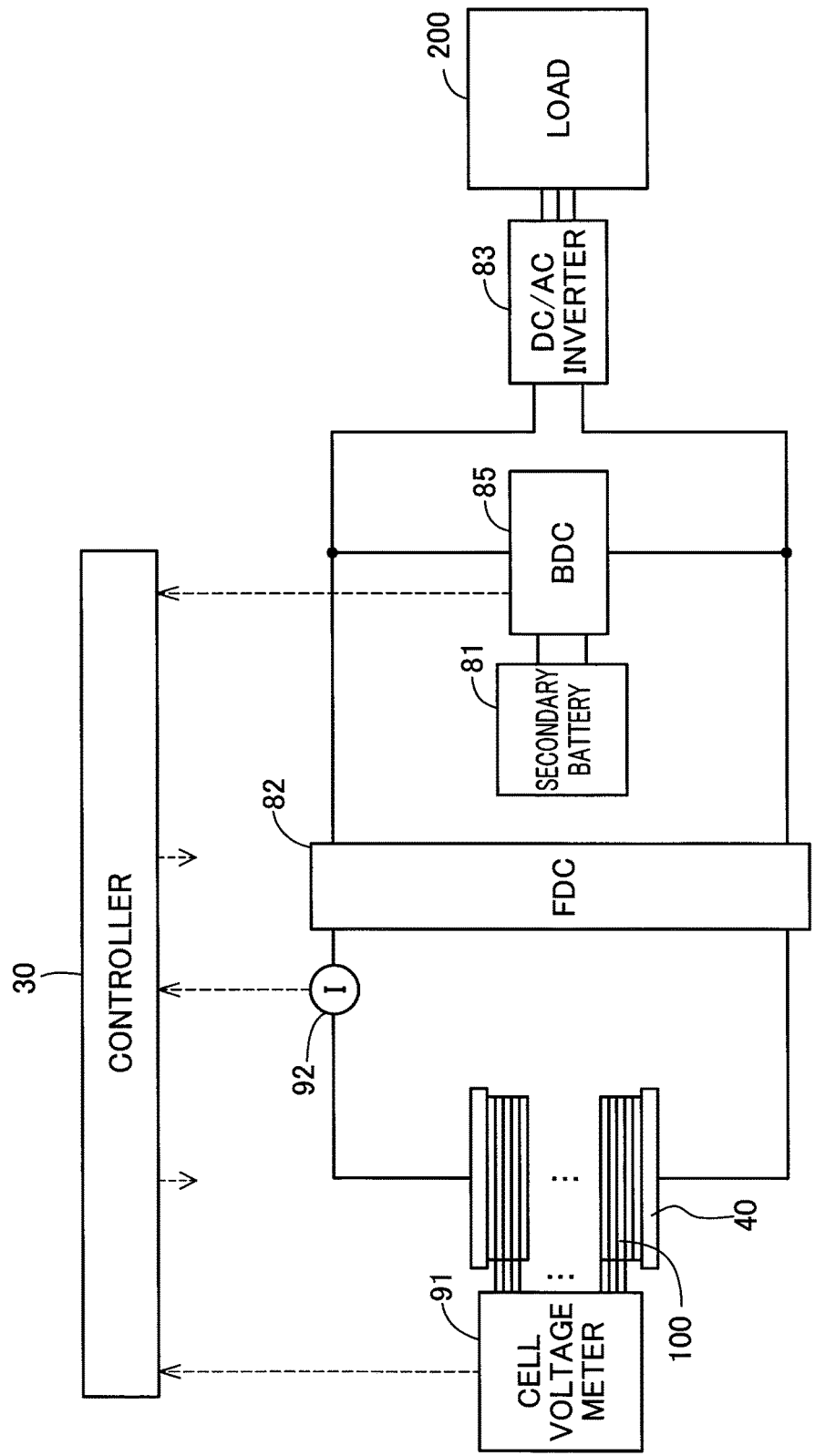
FIG. 3 is a schematic diagram illustrating the electrical configuration of the fuel cell system.

FIG. 3 is a schematic diagram illustrating the electrical configuration of the fuel cell system 20. The fuel cell system 20 includes a secondary battery 81, an FDC 82, a DC/AC inverter 83, a BDC 85, a cell voltage meter 91 and a current measurement unit 92.

The cell voltage meter 91 is connected with each of all the cells 100 included in the fuel cell stack 40 and is configured to measure the cell voltage of each of all the cells 100. The cell voltage meter 91 is configured to send the measurement results to the controller 30. The current measurement unit 92 is configured to measure the value of output current from the fuel cell stack 40 and send the measurement result to the controller 30.

The FDC 82 and the BDC 85 are circuits configured as DC/DC converters. The FDC 82 is configured to control the output current from the fuel cell stack 40, in response to a current command value sent from the controller 30. The current command value denotes a target value of output current from the fuel cell stack 40 and is set by the controller 30.

The FDC 82 serves as an input voltage meter and an impedance meter. More specifically, the FDC 82 is configured to measure the value of an input voltage and send the measured value to the controller 30. The FDC 82 is also configured to measure the impedance of the fuel cell stack 40 by AC impedance method. The frequency of the impedance used in this embodiment includes high frequencies and more specifically includes 100 Hz to 1 kHz. The FDC 82 is configured to boost the input voltage and supply the boosted voltage to the DC/AC inverter 83.

The BDC 85 is configured to control charging and discharging of the secondary battery 81 under control of the controller 30. The BDC 85 is configured to measure the SOC (state of charge) of the secondary battery 81 and send the measured SOC to the controller 30. The secondary battery 81 is configured by, for example, a lithium ion rechargeable battery and serves as an auxiliary power supply.

The DC/AC inverter 83 is connected with the fuel cell stack 40 and a load 200. The DC/AC inverter 83 is configured to convert a DC power output from the fuel cell stack 40 and the secondary battery 81 into an AC power and supply the AC power to the load 200.

The regenerative power that is generated in the load 200 is converted into a DC current by the DC/AC inverter 83 and is charged into the secondary battery 81 by the BDC 85. The controller 30 calculates an output command value by taking into account the SOC of the secondary battery 81 in addition to the load 200.

Figure 4:
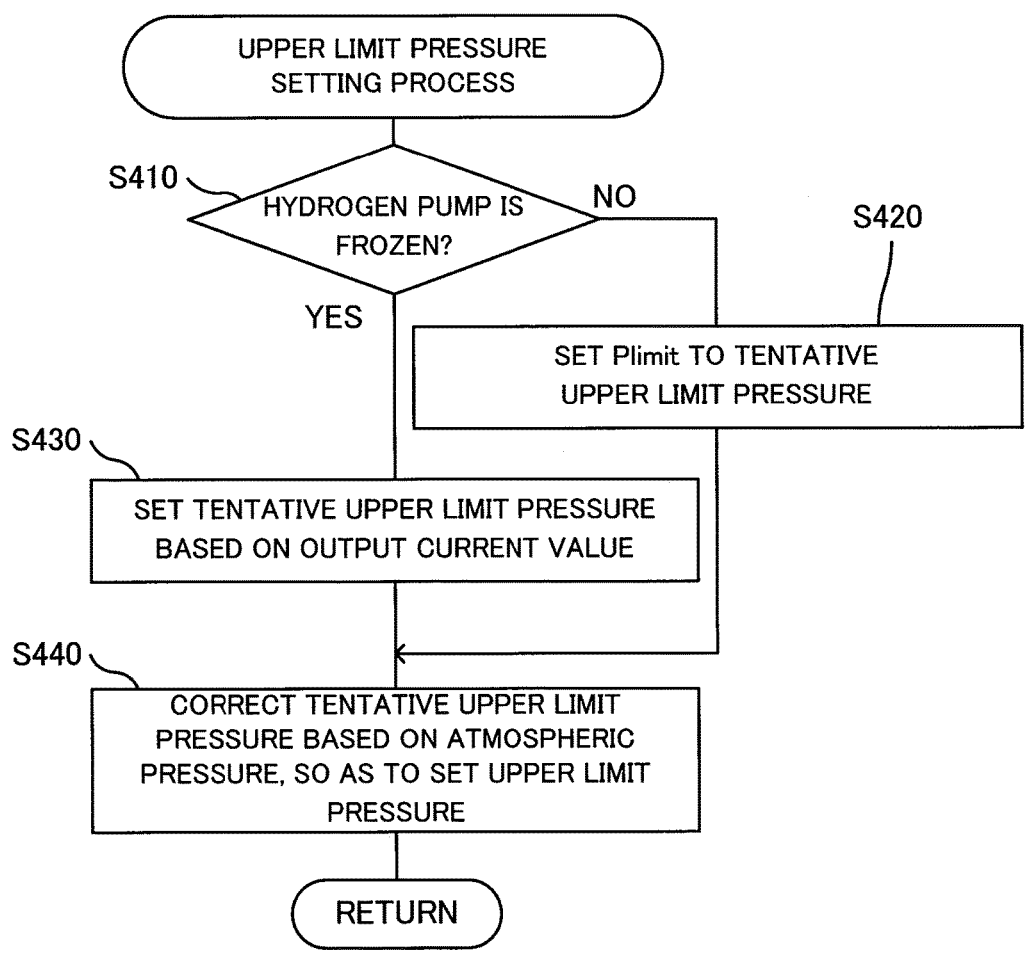
FIG. 4 is a flowchart showing an upper limit pressure setting process.

FIG. 4 is a flowchart showing an upper limit pressure setting process. The controller 30 repeatedly performs the upper limit pressure setting process for a time period between an ON operation and an OFF operation of the power switch S. The controller 30 executes a program that is configured to perform the upper limit pressure setting process and is stored in a storage medium.

The upper limit value setting process is performed in order to prevent malfunction of the relief valve 59, suppress an increase in inter-electrode differential pressure and suppress an increase in exhaust hydrogen concentration. The inter-electrode differential pressure herein denotes a pressure difference between the anode and the cathode in the cell 100. The exhaust hydrogen concentration herein denotes the concentration of hydrogen that is discharged to the atmosphere through the gas liquid separator 57, the discharge pathway 55 and the air discharge flow path 66.

The controller 30 first determines whether an abnormality occurs in the hydrogen pump 53 (S410). More specifically, the controller 30 determines whether the hydrogen pump 53 is frozen, based on the measurement values of the temperature gauge Tp and the resolver R at S410 according to the embodiment. As described above, heat release is more likely to be accelerated in the hydrogen pump 53. The hydrogen pump 53 is thus susceptible to the ambient temperature and is likely to be frozen in the cold time.

When both the conditions that the measurement value of the temperature gauge Tp is lower than a predetermined value (for example, 0° C.) and that the measurement value of the resolver R is deviated from a rotation target value are satisfied, the controller 30 determines that the hydrogen pump 53 is frozen. When both the conditions that the measurement value of the temperature gauge Tp is equal to or higher than the predetermined value and that the measurement value of the resolver R is not deviated from the rotation target value are satisfied, on the other hand, the controller 30 determines that the hydrogen pump 53 is not frozen. This embodiment does not assume the state that only one of the conditions is satisfied.

The deviation described above means that the state with a difference calculated by subtracting the measurement value from the rotation target value is equal to or greater than a reference value continues for a predetermined time period or longer. As described above, the temperature gauge Tp and the resolver R serve as the abnormality detector configured to measure a physical quantity used as an indication to determine whether an abnormality occurs in the hydrogen pump 53.

When no abnormality occurs in the hydrogen pump 53 (S410: NO), the controller 30 sets a pressure value Plimit to a tentative upper limit pressure to (S420). The tentative upper limit pressure is a value provided as a basis to calculate an upper limit pressure and is used at S440. According to this embodiment, the pressure value Plimit is a value that satisfies 200 kPa≤Plimit≤350 kPa.

When an abnormality occurs in the hydrogen pump 53 (S410: YES), on the other hand, the controller 30 sets the tentative upper limit pressure, based on the present value of output current (S430). More specifically, the controller 30 uses a map that is stored in advance, for the processing of S430. This map indicates a predetermined relationship between the tentative upper limit pressure and the output current, such that the exhaust hydrogen concentration becomes equal to or lower than a reference value even when the hydrogen pump 53 is not operated. The consumption amount of hydrogen decreases with a decrease in the output current value, so that the value of tentative upper limit pressure is set to decrease with a decrease in the output current value. The value of tentative upper limit pressure that is set using this map is equal to or lower than the pressure value Plimit.

After the processing of S420 or S430, the controller 30 corrects the tentative upper limit pressure based on the atmospheric pressure, so as to set the upper limit pressure (S440). The controller 30 then repeats this upper limit pressure setting process starting from S410. The processing of S440 is implemented by an equation given below, where Ptmp denotes the tentative upper limit pressure, Pa denotes the measurement value of the atmospheric pressure gauge Patm, and Pd denotes a corrected value of the upper limit pressure. The respective terms in the following equation are all expressed in the unit of kPa, and 101.3 kPa included in the following equation is the value of standard atmospheric pressure and is thus equal to 1 atm.

$$Pd = Ptmp + Pa - 101.3$$

The upper limit pressure is set using the measurement value of the atmospheric pressure as described above. This configuration suppresses malfunction of the relief valve 59 and suppresses an increase in the inter-electrode differential pressure. Suppressing the increase in the inter-electrode differential pressure results in suppressing damage of an electrolyte membrane included in the MEA.

When no abnormality occurs in the hydrogen pump 53 (S410: NO), only the value of the atmospheric pressure is a variable that affects the upper limit pressure. In this case, when the atmospheric pressure is a first value that is higher than the standard atmospheric pressure, the upper limit pressure is set to a first limit value that is higher than the pressure value Plimit. When the atmospheric pressure is a second value that is lower than the standard atmospheric pressure, the upper limit pressure is set to a second limit value that is lower than the pressure value Plimit.

When the atmospheric pressure is equal to the standard atmospheric pressure, the tentative upper limit pressure Ptmp is equal to the upper limit pressure Pd, so that the value set either at S420 or at S430 is set to the upper limit pressure Pd. In this case, the value set at S420 is a first limit value that is set based on the physical quantity used as the indication to determine whether an abnormality occurs in the hydrogen pump 53. The value set at S430 is a second limit value that is set based on the physical quantity used as the indication to determine whether an abnormality occurs in the hydrogen pump 53.

Figure 5:
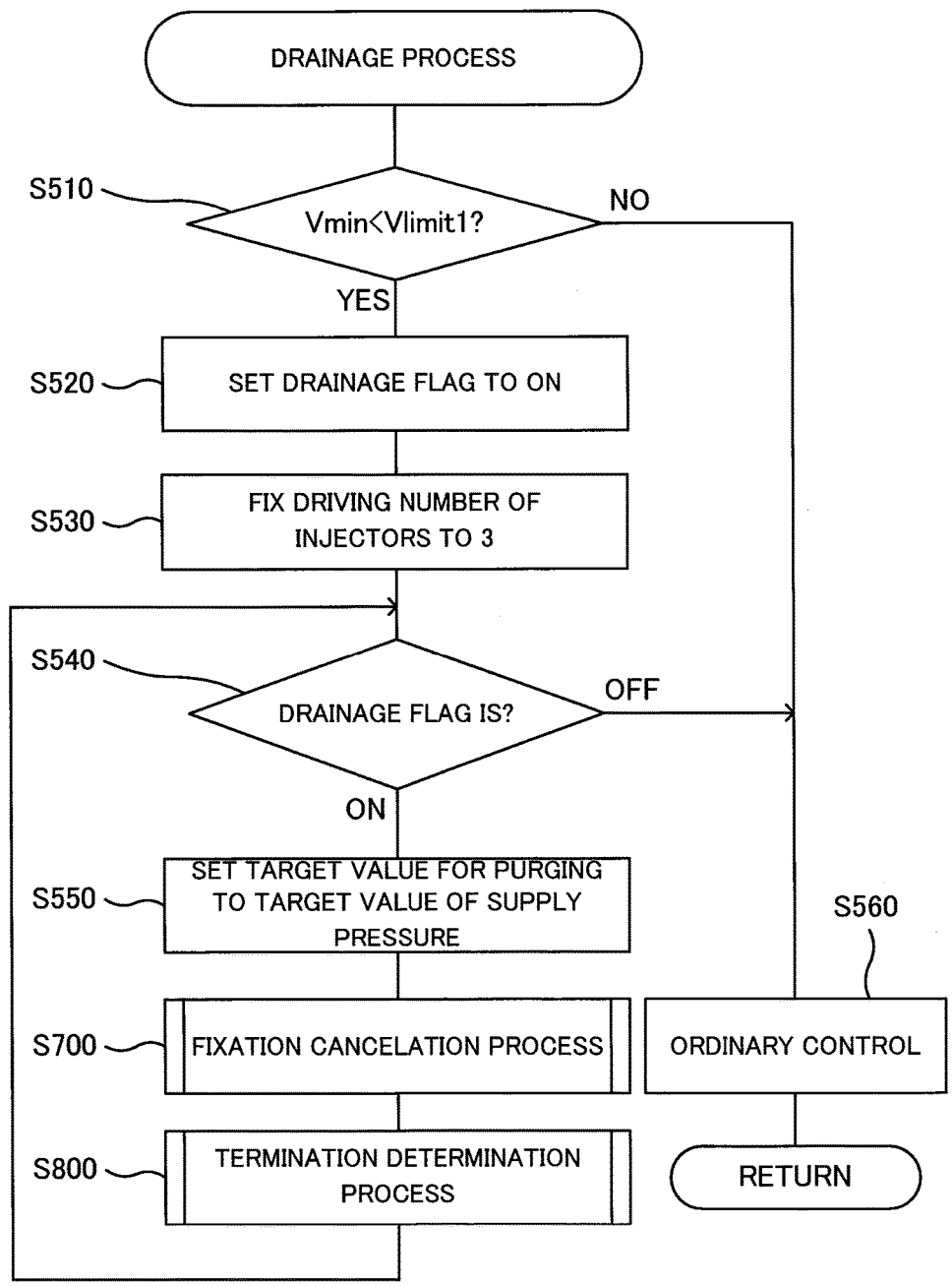
FIG. 5 is a flowchart showing a drainage process.

FIG. 5 is a flowchart showing a drainage process. The controller 30 repeatedly performs the drainage process for a time period between an ON operation and an OFF operation of the power switch S. The controller 30 executes a program that is configured to perform the drainage process and is stored in a storage medium. The drainage process is performed in order to drain anode water from inside of the cell 100. The anode water herein means a large quantity of water that is present in the anode flow path in the cell.

Figure 6:
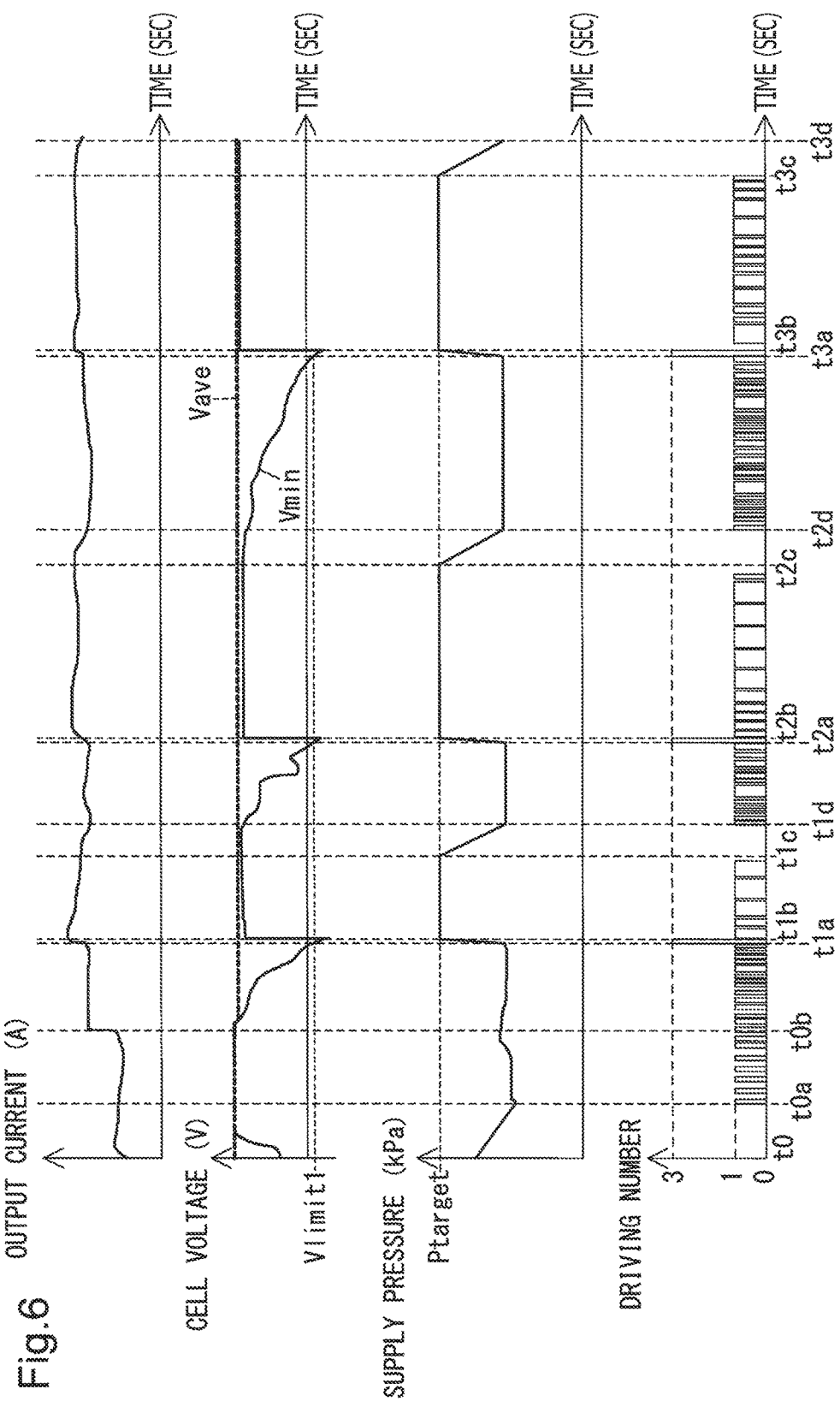
FIG. 6 is a timing charge in the drainage process.

FIG. 6 is a timing chart showing variations of parameters in the drainage process. The parameters are the output current (A), an average value of the cell voltage (V), a minimum value of the cell voltage (V), the supply pressure (kPa) and the driving number.

The average value of the cell voltage (hereinafter referred to as average voltage Vave) is an average value of the values of the respective cells 100 measured by the cell voltage meter 91. The minimum value of the cell voltage (hereinafter referred to as minimum voltage Vmin) is a minimum value among the values of the respective cells 100 measured by the cell voltage meter 91. The following describes the drainage process with referring to FIG. 6.

The controller 30 first determines whether the minimum voltage Vmin is lower than a reference value Vlimit1 (S510). The reference value Vlimit1 is a predetermined voltage value used as a basis to detect generation of a negative voltage. According to this embodiment, the reference value Vlimit1 is a value that satisfies −0.1 V≤Vlimit1≤0 V.

When the minimum voltage Vmin is equal to or higher than the reference value Vlimit 1 (S510: NO), the controller 30 performs ordinary control (S560). The controller 30 then repeats the drainage process starting from S510. The ordinary control herein means that the fuel cell system 20 is operated without being affected by the target value of the supply pressure and the driving number set in the drainage process.

During a time period from a time t0a to a time t1a in FIG. 6, the determination result of NO at S510 and the processing of S560 are repeated. The following describes the phenomena until the time t0a that is prior to the time t1a.

A time period from a time t0 to the time t0a is a time period for a change of the operating state from a starting operation to an ordinary operation. The starting operation denotes an operation to start the fuel cell system 20 in response to an ON operation of the power switch S. The ordinary operation denotes an operation according to a required electric power.

The driving number is set to 0 during the time period from the time t0 to the time t0a. The driving number is set to 0 since the supply pressure has reached the target value by operation of the hydrogen pump 53.

In the illustrated example of FIG. 6, the cell 100 with the minimum voltage as its measured value is consistently the cell 100 that is in contact with the front end-side end plate 170F (hereinafter referred to as front end cell). The front end cell is affected by heat release of the front end-side end plate 170F as described above and is thus likely to have a large quantity of the anode water. As a result, the front end cell is more likely to cause deficiency of hydrogen and have a lower cell voltage, compared with the other cells 100.

The driving number is either 0 or 1 during the time period from the time t0a to the time t1a. This is because the supply pressure continues decreasing before the time t0a and supply of hydrogen from the hydrogen tank 51 is needed at the time t0a.

At a time t0b, the output current increases as the result of control by the controller 30. The minimum voltage starts decreasing accompanied with the increase in the output current.

The minimum voltage continues decreasing from the time t0b to the time t1a and becomes lower than the reference value Vlimit1 at the time t1a. Accordingly the controller 30 provides the determination result of YES at S510 at the time t1a.

In response to the determination result of YES at S510, the controller 30 sets a drainage flag to ON (S520) and fixes the driving number to 3 (S530). The drainage flag is used at S540 (described below).

The controller 30 subsequently identifies the setting of the drainage flag (S540). The setting of the drainage flag is identified as ON at the first processing of S540 in the drainage process (S540: ON). The controller 30 subsequently sets a value for purging (hereinafter referred to as target value for purging Ptargt) to the target value of the supply pressure (S550). More specifically, the controller 30 sets the lower between 250 kPa and the upper limit pressure described above to the target value of the supply pressure. In the description below, controlling the supply pressure to the target value for purging Ptarget is called anode purging. In most cases, the target value for purging Ptarget is a value that is higher than the target value of the supply pressure during ordinary operation.

Fixation of the driving number at S530 is shown as the driving number of 3 during a time period from the time t1a to a time t1b in FIG. 6. In FIG. 6, the supply pressure abruptly increases from the time t1a. This abrupt increase is attributed to fixing the driving number and setting the target value for purging Ptarget to the supply pressure at S550. The process of fixing the driving number and performing the anode purging is called first control.

As a result of the abrupt increase in the supply pressure, the minimum cell voltage and the output current abruptly increase at the time t1a. This is because the differential pressure between the upstream side and the downstream side in the anode flow path in the front end cell increases as a result of the abrupt increase in the supply pressure, so as to temporarily eliminate accumulation of the anode water that interferes with the flow of hydrogen. The details of this phenomenon will be described later. After the processing of S550, the controller 30 performs a fixation cancellation process (S700).

Figure 7:
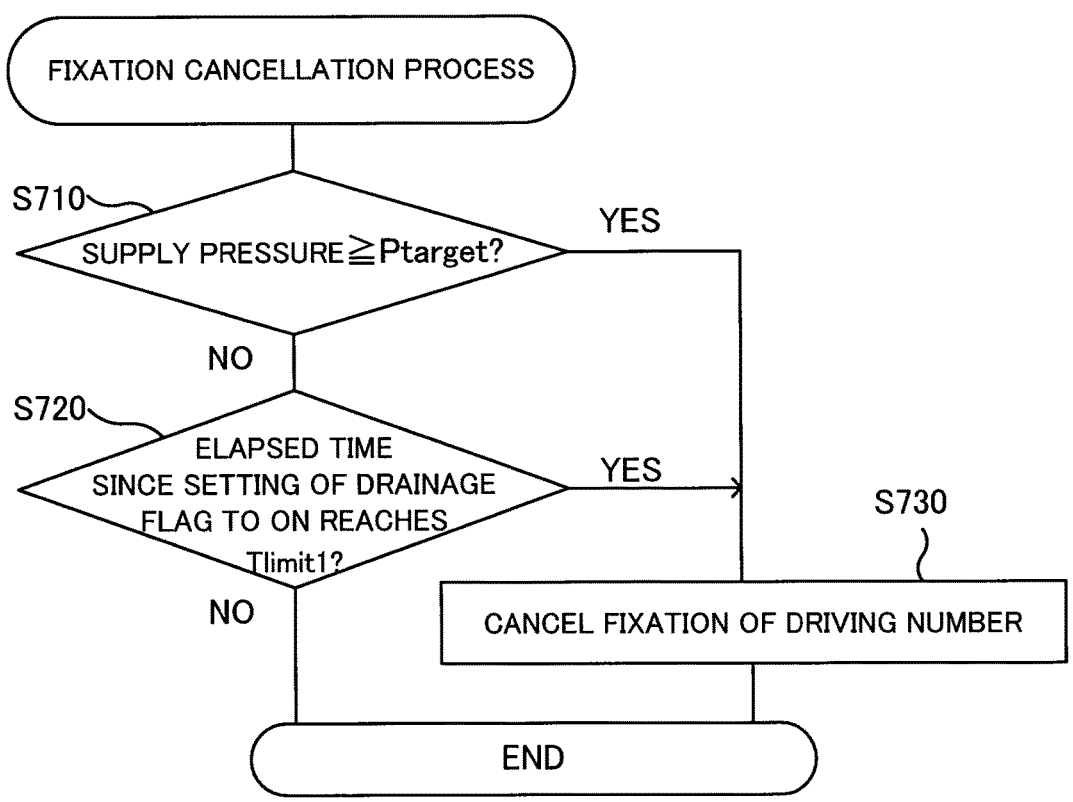
FIG. 7 is a flowchart showing a fixation cancellation process.

FIG. 7 is a flowchart showing the fixation cancellation process. The controller 30 first determines whether the supply pressure becomes equal to or higher than the target value for purging Ptarget (S710). The controller 30 uses a value obtained by processing the measurement value of the low pressure-side pressure gauge Phl with a low pass filter, as the value of supply pressure at S710. When the supply pressure is lower than the target value for purging Ptarget (S710: NO), the controller 30 subsequently determines whether a time elapsed since the setting of the drainage flag to ON reaches a transit time Tlimit1 (S720). According to this embodiment, the transit time Tlimit1 is a value that satisfies 1 second≤Tlimit1≤5 seconds. The elapsed time since the setting of the drainage flag to ON is equal to a time elapsed since fixation of the driving number to 3. When this elapsed time is less than the transit time Tlimit1 (S720: NO), the controller 30 terminates the fixation cancellation process while maintaining the fixation of the driving number.

Figure 8:
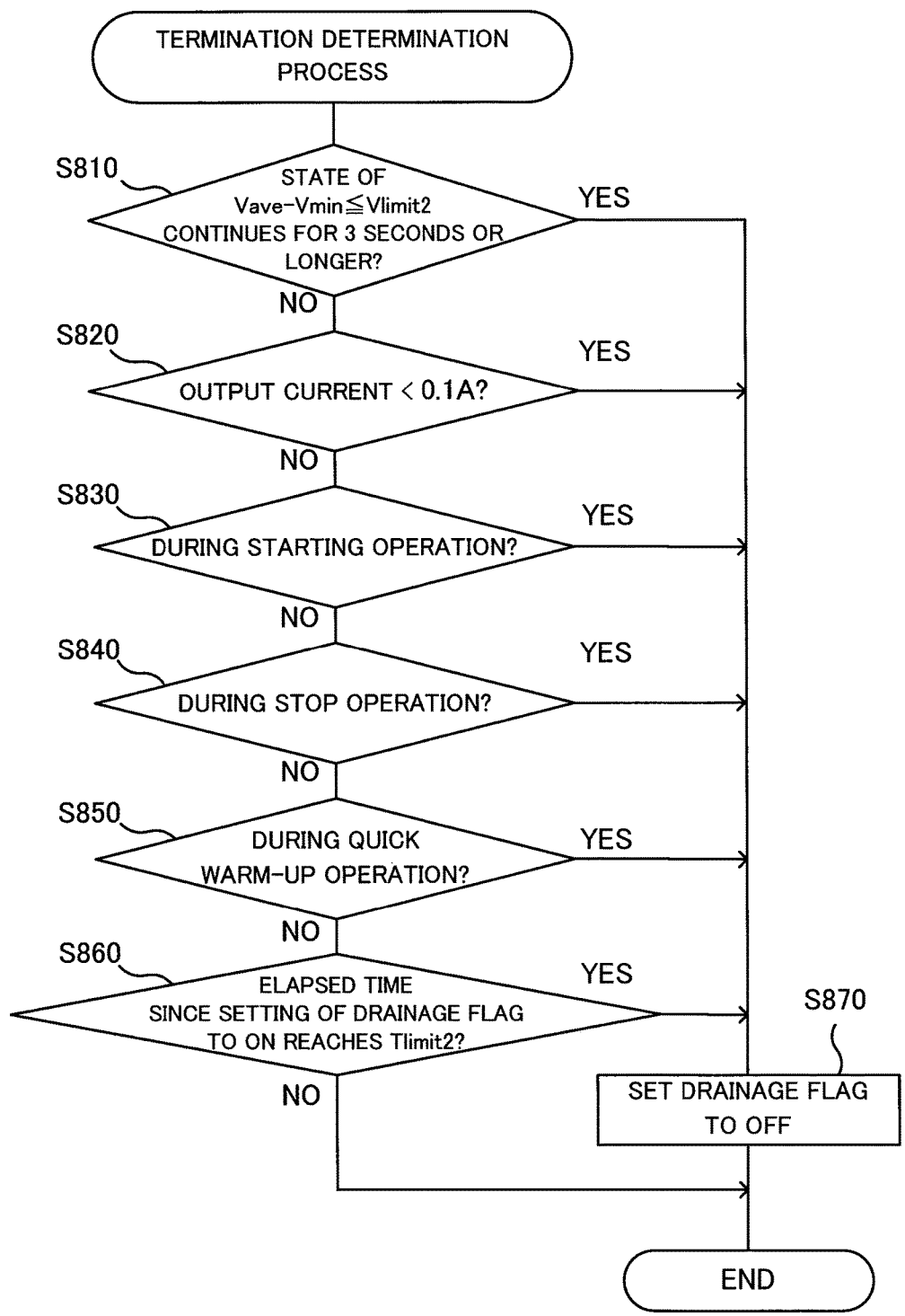
FIG. 8 is a flowchart showing a termination determination process.

The controller 30 subsequently performs a termination determination process (S800) described later with reference to FIG. 8 and then returns to S540. The controller 30 repeats the processing of S540 to S800 until the identification result of OFF is provided at S540. The processing of S540 to S800 is repeated during the time period from the time t1a to the time t1b in FIG. 6.

Referring back to FIG. 7, when the supply pressure becomes equal to or higher than the target value for purging Ptarget (S710: YES) or when the time elapsed since the setting of the drainage flag to ON reaches the transit time Tlimit1 (S720: YES), the controller 30 cancels the fixation of the driving number (S730) and terminates the fixation cancellation process. The fixation of the driving number is cancelled in response to the determination result of YES at S720 even when the supply pressure does not become equal to or higher than the target value for purging Ptarget. Such cancellation of the fixation aims to suppress the reducing quietness.

As shown in FIG. 6, the driving number is either 0 or 1 after the time t1b. This is because the fixation of the driving number is cancelled and the driving number of 0 or 1 is sufficient to maintain the supply pressure at the target value for purging Ptarget. As shown in FIG. 6, the fixation of the driving number is cancelled when the supply pressure reaches the target value for purging Ptarget (S710: YES). Even after the fixation of the driving number is cancelled, the driving number may be set to 3 according to a large required electric power. The process of cancelling the fixation of the driving number and continuing the anode purging is called second control.

When the termination determination process (S800) is triggered, the controller 30 first determines whether the state where the difference between the average voltage Vave and the minimum voltage Vmin is within a reference value Vlimit2 continues for three seconds or longer (S810). According to this embodiment, the reference value Vlimit2 is a value that satisfies 0.05 V≤Vlimit2≤0.5 V. The reference value Vlimit2 is a predetermined voltage difference used to determine whether a termination condition is satisfied. The termination condition herein denotes a predetermined voltage difference used as a basis to detect elimination of the accumulation of the anode water.

When the time duration of the state where the difference is within the reference value Vlimit2 is equal to three seconds or longer (S810: YES), the controller 30 sets the drainage flag to OFF (S870) and terminates the termination determination process. In the description below, the process of the controller 30 that sets the drainage flag to OFF and terminates the termination determination process is expressed as "to perform the processing of S870".

When the drainage flag is OFF, the controller 30 provides the identification result of OFF at S540 and accordingly performs the ordinary control (S560). Accordingly the supply pressure is not set at 5550 but is set according to a required electric power. When the flow of drainage process goes to S560 without cancelling the fixation of the driving number (S730), the controller 30 cancels the fixation of the driving number at S560.

In the illustrated example of FIG. 6, the supply pressure decreases and the driving number is equal to 0 after a time t1c. This means that the processing of S560 is performed at the time t1c. In the illustrated example of FIG. 6, the processing of S560 is performed in response to the determination result of YES at S810 immediately before the time t1c.

When the time duration of the state where the difference is within the reference value Vlimit2 is less than 3 seconds (including 0 second) (S810: NO), on the other hand, the controller 30 subsequently determines whether the output current is less than 0.1 A (S820). The output current of less than 0.1 A means that the output current is approximately equal to zero. The value of output current used at S820 is a value processed with a low pass filter.

When the output current is less than 0.1 A (S820: YES), the controller 30 performs the processing of S870. When the output current is approximately equal to zero, deterioration of the cell 100 is less likely to proceed. Accordingly the control is returned to the ordinary control for the purpose of suppressing reduction of the fuel consumption.

When the output current is equal to or greater than 0.1 A (S820: NO), on the other hand, the controller 30 subsequently determines whether the operating state is during the starting operation (S830). When the operating state is during the starting operation (S830: YES), the controller 30 performs the processing of S870. This is because priority is given to the control for the operating state other than the ordinary operation over the drainage process. The same applies to the processing of S840 and the processing of S850 described below.

When the operating state is not during the starting operation (S830: NO), on the other hand, the controller 30 subsequently determines whether the operating state is during a stop operation (S840). When the operating state is during the stop operation (S840: YES), the controller 30 performs the processing of S870. The stop operation denotes an operation to stop the fuel cell system 20 in response to an OFF operation of the power switch S.

When the operating state is not during the stop operation (S840: NO), on the other hand, the controller 30 subsequently determines whether the operating state is during a quick warm-up operation (S850). When the operating state is during the quick warm-up operation (S850: YES), the controller 30 performs the processing of S870. The quick warm-up operation denotes an operation of the fuel cell system 20 at an operation point of low power generation efficiency, with a view to quickly increasing the cell temperature.

When the operating state is not during the quick warm-up operation (S850: NO), on the other hand, the controller 30 subsequently determines whether a time elapsed since the setting of the drainage flag to ON reaches a termination time Tlimit2 (S860). According to this embodiment, the termination time Tlimit2 is a value that satisfies 5 seconds<Tlimit2≤20 seconds. When this elapsed time reaches the termination time Tlimit2 (S860: YES), the controller 30 performs the processing of S870. When the elapsed time reaches the termination time Tlimit2, the processing of S870 is performed, in order to temporarily decrease the supply pressure and subsequently perform the first control again. The first control enhances the effect of eliminating the accumulation of the anode water as described later.

When the elapsed time does not reach the termination time Tlimit2 (S860: NO), on the other hand, the controller 30 terminates the termination determination process without performing the processing of S870.

In the illustrated example of FIG. 6, at a time t1d, the driving number becomes equal to 1 and the decrease of the supply pressure is stopped. The supply pressure at the time t1d is approximately equal to the target value during the ordinary control.

The minimum voltage Vmin decreases after the time t1d. This decrease is attributed to the occurrence of accumulation of the anode water again. As a result, at a time t2b, the minimum voltage Vmin again becomes lower than the reference value Vlimit1 (S510: YES). Accordingly the processing of S520 to S550, the fixation cancellation process (S700) and the termination determination process (S800) are performed again. As a result, the minimum voltage Vmin increases to a value closer to the average voltage Vave after the time t2b.

When the supply pressure becomes approximately equal to the target value during the ordinary operation at a time t2d, the minimum voltage Vmin starts decreasing once again. Accordingly the anode purging is performed once again during a time period from a time t3a to a time t3c. After a time t3d (not shown), even when the supply pressure becomes approximately equal to the target value, there is little decrease of the minimum voltage Vmin. This is because a large quantity of the anode water that has clogged the flow path in the front end cell has been discharged from inside of the front end cell.

The drainage process described above suppresses the reducing quietness, while ensuring the sufficient effect for removal of the anode water. These apparently competing requirements are satisfied since the first control (i.e., fixation of the driving number) is limited to the effective timings and thereby takes only a short time period. The effective timings herein include the timing when the supply pressure abruptly increases and the timing when the flow path is clogged with the anode water.

At the timing when the supply pressure abruptly increases, the pressure difference between the upstream side and the downstream side becomes greater than the value of a pressure loss. The pressure difference thus generated (hereinafter referred to as transient pressure difference) increases with an increase in the rate of rise of the supply pressure. Fixing the driving number to 3 at this timing accordingly increases the rate of rise of the supply pressure and enhances the effect of eliminating the accumulation of the anode water.

After the increase of the supply pressure is stopped, the fixation of the driving number is cancelled. This aims to suppress the reducing quietness. There is generally only a short time period until the supply pressure reaches the target value for purging Ptarget. Any of the driver and passengers of the motor vehicle 1 is thus less likely to feel the reducing quietness by the fixation of the driving number.

The timing when the flow path is clogged with the anode water denotes the timing when the anode water is not flowed. The timing when the anode water is flowed, on the contrary, denotes the timing when the anode water is present in the flow path but is flowed without clogging the flow path. The anode flow path includes locations where the anode water is more likely to flow and locations where the anode water is less likely to flow. For example, the anode water accumulated in a certain location where the anode water is less likely to flow is pressed toward downstream by the transient pressure difference and subsequently passes through the location where the anode water is more likely to flow for some time. The anode water is thus flowed toward downstream without the transient pressure difference. The anode water then reaches and is accumulated in another location where the anode water is less likely to flow.

Accordingly the phenomenon that the anode water is accumulated in the location where the anode water is less likely to flow occurs at discrete timings. The anode purging is once terminated at S810 and S860 included in the termination determination process. This configuration enables the first control to be performed at these timings and thereby achieves the advantageous effects described above.

Figure 9:
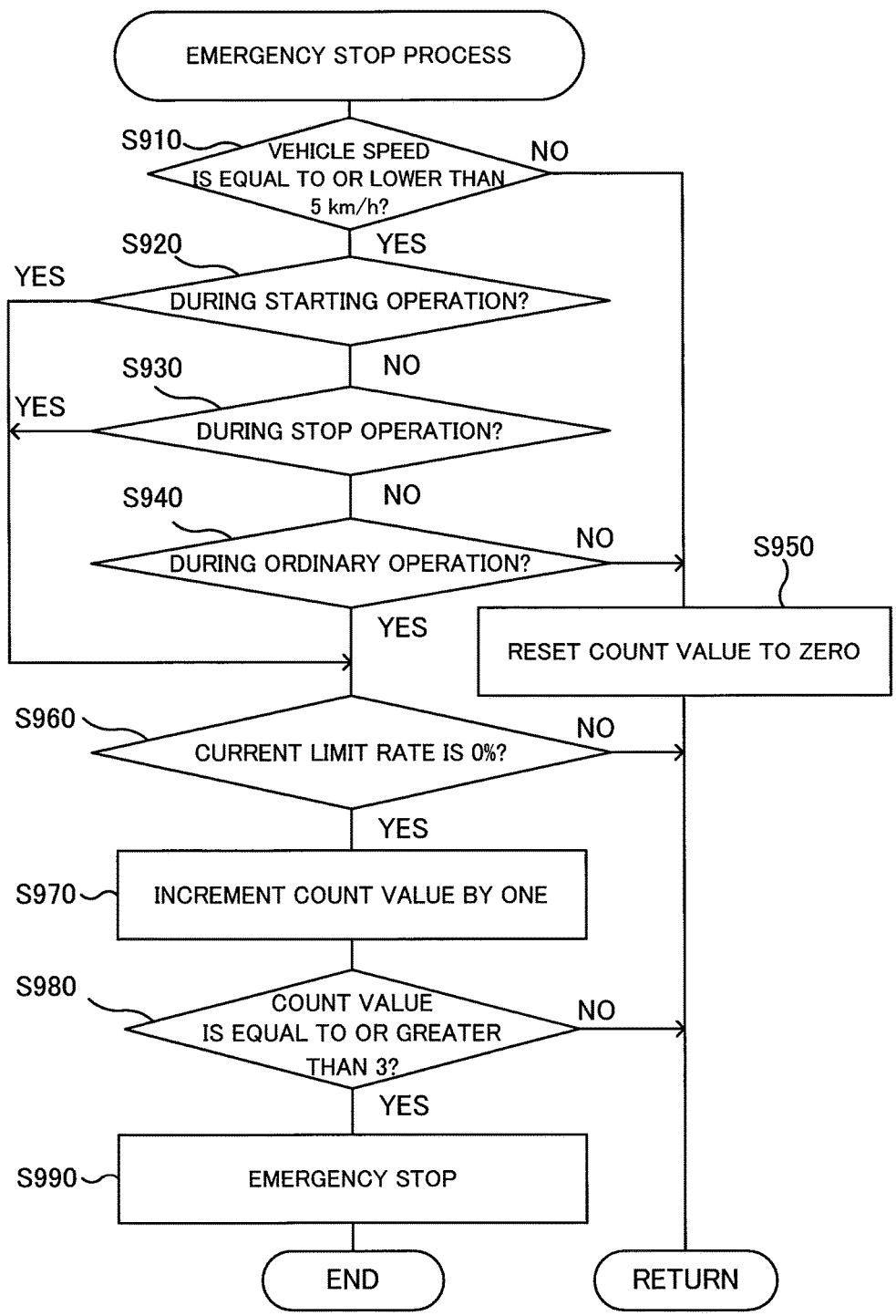
FIG. 9 is a flowchart showing an emergency stop process.

FIG. 9 is a flowchart showing an emergency stop process. The controller 30 repeatedly performs the emergency stop process for a time period between an ON operation and an OFF operation of the power switch S. The controller 30 executes a program that is configured to perform the emergency stop process and is stored in a storage medium. The emergency stop process is a process performed in order to stop the operation of the fuel cell system 20 when the minimum voltage is not recovered by the drainage process.

The controller 30 first determines whether the vehicle speed is equal to or lower than 5 km/h (S910). When the vehicle speed is higher than 5 km/h (S910: NO), the controller 30 resets a count value stored in a counter to zero (S950). The controller 30 then repeats the emergency stop process starting from S910. The counter will be described later. An emergency stop (S990) described later is a process performed during stop of the vehicle or during slow driving. Accordingly S910 is a determination step not to perform the emergency stop (S990) on any occasion other than during stop of the vehicle or during slow driving.

When the vehicle speed is lower than 5 km/h (S910: YES), the controller 30 subsequently determines whether the operating state is during the starting operation (S920). When the operating state is not during the starting operation (S920: NO), the controller 30 subsequently determines whether the operating state is during the stop operation (S930). When the operating state is not during the stop operation (S930: NO), the controller 30 subsequently determines whether the operating state is during the ordinary operation (S940). When the operating state is not during the ordinary operation (S940: NO), the controller 30 performs the processing of S950.

When the operating state is during the starting operation (S920: YES), when the operating state is during the stop operation (S930: YES) or when the operating state is during the ordinary operation (S940: YES), on the other hand, the controller 30 subsequently determines whether a limit rate of the output current (hereinafter referred to as current limit rate) reaches 0% (S960). The current limit rate is originally a value by which the target value of the output current is to be multiplied and is generally 100%.

The controller 30 sets the current limit rate to a value that is lower than 100% when the minimum voltage becomes a negative voltage (smaller than zero). When the minimum voltage is a negative voltage, the controller 30 sets a lower value to the current limit rate with an increase in absolute value of the minimum voltage. When the minimum voltage becomes equal to or lower than a reference voltage value (for example, −0.3 V), the controller 30 sets the current limit rate to 0%.

When the current limit rate is set to a value higher than 0% (S960: NO), the controller 30 repeats the emergency stop process starting from S910.

When the current limit rate is set to 0% (S960: YES), on the other hand, the controller 30 increments the count value by 1 (S970) and subsequently determines whether the count value is equal to or greater than 3 (S980). When the count value is less than 3 (S980: NO), the controller 30 repeats the emergency stop process starting from S910.

When the count value is equal to or greater than 3 (S980: YES), on the other hand, the controller 30 performs an emergency stop (S990) and terminates the emergency stop process. The emergency stop is an operation to stop the fuel cell system 20. The controller 30 then informs the driver of the motor vehicle 1 of the occurrence of an emergency stop and causes the electric power consumed by the motor vehicle 1 to be supplied from the secondary battery 81.

The case where the count value becomes equal to or greater than 3 means the case where the determination result of YES is provided at S960 three or more times without performing the processing of S950. The determination result of YES provided at the second and subsequent determinations of S960 is attributed to the following operation of the controller 30.

After setting the current limit rate to 0%, the controller 30 gradually increases the current limit rate from 0% and determines whether the negative voltage is eliminated. When the negative voltage is eliminated, the controller 30 increases the current limit rate toward 100%. When the negative voltage is not eliminated, the controller 30 again sets the current limit rate to 0%. The count value is incremented when the processing of S950 is not performed for a time period between setting of the current limit rate to 0% and next setting of the current limit rate to 0%. The controller 30 assumes the occurrence of an abnormality that is not eliminated by the anode purging process, based on the fact that the count value becomes equal to or greater than 3.

Performing the emergency stop process suppresses the cells 100 from being significantly damaged.

The following describes modifications. The number of injectors mounted in the fuel cell system may be any plural number. When a number "n" of injectors are mounted, the driving number that is to be fixed at S530 may be the number "n".

The upper limit pressure may be set without taking into account the occurrence or non-occurrence of an abnormality in the hydrogen pump 53 or may be set without taking into account the value of the atmospheric pressure. For example, the upper limit pressure may be a fixed value.

The determination of whether the hydrogen pump 53 is frozen may be only based on the measurement value of the temperature gauge Tp or may be only based on the deviation of the measurement value of the resolver R from the rotation target value.

The abnormality of the hydrogen pump 53 may not be necessarily limited to the state that the hydrogen pump 53 is frozen. For example, the abnormality of the hydrogen pump 53 may be detected as a failure of the hydrogen pump 53. The failure of the hydrogen pump 53 may be detected by, for example, disconnection of wiring for operation of the hydrogen pump 53. For example, the deviation of the measurement value of the resolver R from the rotation target value may be treated as the indication to detect disconnection of wiring.

The cell voltage meter 91 may not be necessarily configured to measure the cell voltages of all the cells 100. For example, the measurement object of the cell voltage meter 91 may be only the front end cell.

The relief valve 59 may be omitted.

The motor vehicle 1 may be a connected car. The connected car is an automobile that is provided with communication equipment to receive services by cloud communications. In this case, the value of the atmospheric pressure surrounding the motor vehicle 1 may be obtained by communication.

According to one aspect of the disclosure, there may be provided a fuel cell system. This fuel cell system may comprise a fuel cell stack configured to include a plurality of cells; a number "n" of injectors arranged in parallel to supply an anode gas to the fuel cell stack, where the number "n" represents an integral number of not less than 2; a cell voltage meter configured to measure a voltage of at least one cell among the plurality of cells; a pressure gauge configured to measure a supply pressure that is a pressure of the anode gas supplied to the fuel cell stack; and a controller configured to respectively input control signals into the number "n" of injectors by using the voltage measured by the cell voltage meter and the supply pressure measured by the pressure gauge and to control a driving number that denotes a number of injectors to be driven among the number "n" of injectors. When the measured voltage is equal to or higher than a predetermined voltage value, the controller is configured to set a target value of the supply pressure and the driving number according to a required electric power. When the measured voltage is lower than the predetermined voltage value, the controller is configured to perform a first control that fixes the driving number to the number "n" while setting a target value for purging that is a higher value than the target value according to the required electric power, to the target value of the supply pressure. When the supply pressure reaches the target value for purging by the first control, the controller is configured to perform a second control that cancels fixation of the driving number while continuing setting the target value for purging to the target value of the supply pressure. The fuel cell system of this aspect suppresses the reducing quietness. In the second control, the driving number may be less than the number "n". This configuration provides the better quietness, compared with a configuration that drives the number "n" of the injectors.

The fuel cell system of the above aspect may further comprise an atmospheric pressure acquirer configured to obtain a value of atmospheric pressure surrounding the fuel cell system. The controller may be configured to set the target value for purging to be not greater than a first limit value when the obtained value of atmospheric pressure is a first value and to set the target value for purging to be not greater than a second limit value that is lower than the first limit value when the obtained value of atmospheric pressure is a second value that is lower than the first value. The fuel cell system of this aspect suppresses an electrolyte membrane included in the cell from being damaged by the effect of an inter-electrode differential pressure. The inter-electrode differential pressure denotes a pressure difference between an anode and a cathode in the cell.

The fuel cell system of the above aspect may further comprise a relief valve provided in a flow path of the anode gas that is arranged to connect the injectors with the fuel cell stack and configured to be opened when a difference between the supply pressure and the atmospheric pressure becomes equal to or greater than a reference value. The controller may be configured to set the first limit value or the second limit value according to a difference between the obtained value of atmospheric pressure and a standard atmospheric pressure. The fuel cell system of this aspect suppresses malfunction of the relief valve.

The fuel cell system of the above aspect may further comprise a hydrogen pump configured to supply a gas that is discharged from an anode of the fuel cell stack, to the fuel cell stack again; and an abnormality detector configured to measure a physical quantity that is used as an indication to determine whether an abnormality occurs in the hydrogen pump. The controller may be configured to set the target value for purging to be not greater than a first limit value when the measured physical quantity indicates that no abnormality occurs in the hydrogen pump and to set the target value for purging to be not greater than a second limit value that is lower than the first limit value when the measured physical quantity indicates that an abnormality occurs in the hydrogen pump. The fuel cell system of this aspect suppresses an increase in exhaust hydrogen concentration when an abnormality occurs in the hydrogen pump.

In the fuel cell system of the above aspect, the abnormality of the hydrogen pump may be that the hydrogen pump is frozen. The fuel cell system of this aspect may use a value that is characteristic of the frozen state of the hydrogen pump, as the physical quantity that is used as the indication to determine whether an abnormality arises in the hydrogen pump.

In the fuel cell system of the above aspect, the abnormality detector may include a temperature gauge configured to measure a temperature of the hydrogen pump. The fuel cell system of this aspect uses the temperature gauge that is provided for the purpose of monitoring a temperature increase of the hydrogen pump to high temperature, to determine whether the hydrogen pump is frozen.

In the fuel cell system of the above aspect, the abnormality detector may include a resolver configured to measure a rotation speed of the hydrogen pump. The fuel cell system of this aspect uses the resolver that is provided for the purpose of controlling the rotation speed of the hydrogen pump, to determine whether the hydrogen pump is frozen.

In the fuel cell system of the above aspect, the controller may be configured to set a first pressure value to the second limit value when an output current of the fuel cell stack is a first current value and to set a second pressure value that is lower than the first pressure value to the second limit value when the output current is a second current value that is lower than the first current value. The fuel cell system of this aspect adequately suppresses an increase in exhaust hydrogen concentration.

The fuel cell system of the above aspect may further comprise an atmospheric pressure acquirer configured to obtain a value of atmospheric pressure surrounding the fuel cell system. The controller may be configured to correct the first limit value or the second limit value with the obtained value of atmospheric pressure. The fuel cell system of this aspect suppresses the electrolyte membrane from being damaged by the effect of the inter-electrode differential pressure.

In the fuel cell system of the above aspect, the controller may be configured to shift from the first control to the second control when the supply pressure fails to reach the target value for purging by the first control and a time elapsed since a start of the first control reaches a predetermined transit time. The fuel cell system of this aspect suppresses the reducing quietness, compared with a configuration that performs the first control until the supply pressure reaches the target value for purging.

In the fuel cell system of the above aspect, the cell voltage meter may be configured to measure voltages of at least two cells among the plurality of cells. The controller may be configured to terminate the second control when a termination condition is satisfied. The termination condition is that a state where a difference between an average value of measurements results of the cell voltage meter and a minimum value included in the measurement results of the cell voltage meter is equal to or less than a predetermined voltage difference continues for a predetermined time period. The fuel cell system of this aspect enables the second control to be terminated adequately.

In the fuel cell system of the above aspect, the controller may be configured to terminate the second control when a time elapsed since a start of the first control reaches a predetermined termination time before the termination condition is satisfied. The first control is configured to press a large quantity of water that is present in the anode flow path in the cell (hereinafter referred to as anode water), toward downstream. This configuration provides the large effect of eliminating accumulation of the anode water. In the case where the termination condition is not satisfied even when the elapsed time reaches the termination time, the fuel cell system of this aspect may be configured to temporarily reduce the target value of the supply pressure, such as to be ready for performing the first control.

In the fuel cell system of the above aspect, the controller may be configured to stop power generation by the fuel cell stack when a measurement result by the cell voltage meter reaches a reference voltage value that is lower than the predetermined voltage value. The fuel cell system of this aspect prevents the cell from being damaged.

The present disclosure may be implemented by various aspects other than the aspects of the fuel cell system described above, for example, a method of operating a fuel cell, a program configured to implement this method, and a non-transitory storage medium in which this program is stored.

What is claimed is:
1. A fuel cell system, comprising:
a fuel cell stack configured to include a plurality of cells;
a number "n" of injectors arranged in parallel to supply an anode gas to the fuel cell stack, where the number "n" represents an integral number of not less than 2;
a cell voltage meter configured to measure a voltage of at least one cell among the plurality of cells;
a pressure gauge configured to measure a supply pressure that is a pressure of the anode gas supplied to the fuel cell stack; and
a controller configured to respectively input control signals into the number "n" of injectors by using the voltage measured by the cell voltage meter and the supply pressure measured by the pressure gauge and to control a driving number that denotes a number of injectors to be driven among the number "n" of injectors, wherein
when the measured voltage is equal to or higher than a predetermined voltage value, the controller is configured to set a target value of the supply pressure and the driving number according to a required electric power,
when the measured voltage is lower than the predetermined voltage value, the controller is configured to perform a first control that fixes the driving number to the number "n" while setting a target value for purging that is a higher value than the target value according to the required electric power to the target value of the supply pressure, and
when the supply pressure reaches the target value for purging by the first control, the controller is configured to perform a second control that cancels fixation of the driving number while continuing setting the target value for purging to the target value of the supply pressure.

2. The fuel cell system according to claim 1, wherein the controller is configured to shift from the first control to the second control when the supply pressure fails to reach the target value for purging by the first control and a time elapsed since a start of the first control reaches a predetermined transit time.

3. The fuel cell system according to claim 1, wherein the controller is configured to stop power generation by the fuel cell stack when the measured voltage reaches a reference voltage value that is lower than the predetermined voltage value.

4. The fuel cell system according to claim 1, wherein the cell voltage meter is configured to measure voltages of at least two cells among the plurality of cells, and
the controller is configured to terminate the second control when a termination condition is satisfied, wherein the termination condition is a state where a difference between an average value of measurements results of the cell voltage meter and a minimum value included in the measurement results of the cell voltage meter remains equal to or less than a predetermined voltage difference for a predetermined time period.

5. The fuel cell system according to claim 4, wherein the controller is configured to terminate the second control when a time elapsed since a start of the first control reaches a predetermined termination time before the termination condition is satisfied.

6. The fuel cell system according to claim 1, further comprising:
an atmospheric pressure acquirer configured to obtain a value of atmospheric pressure surrounding the fuel cell system, wherein
the controller is configured to set the target value for purging to be not greater than a first limit value when the obtained value of atmospheric pressure is a first value and to set the target value for purging to be not greater than a second limit value that is lower than the first limit value when the obtained value of atmospheric pressure is a second value that is lower than the first value.

7. The fuel cell system according to claim 6, further comprising:
a relief valve provided in a flow path of the anode gas that is arranged to connect the injectors with the fuel cell stack and configured to be opened when a difference between the supply pressure and the atmospheric pressure becomes equal to or greater than a reference value, wherein the controller is configured to set the first limit value or the second limit value according to a difference between the obtained value of atmospheric pressure and a standard atmospheric pressure.

8. The fuel cell system according to claim 1, further comprising:

a hydrogen pump configured to supply a gas that is discharged from an anode of the fuel cell stack, to the fuel cell stack again; and an abnormality detector configured to measure a physical quantity that is used as an indication to determine whether an abnormality occurs in the hydrogen pump, wherein the controller is configured to set the target value for purging to be not greater than a first limit value when the measured physical quantity indicates that no abnormality occurs in the hydrogen pump and to set the target value for purging to be not greater than a second limit value that is lower than the first limit value when the measured physical quantity indicates that an abnormality occurs in the hydrogen pump.

9. The fuel cell system according to claim 8, wherein the controller is configured to set a first pressure value to the second limit value when an output current of the fuel cell stack is a first current value and to set a second pressure value that is lower than the first pressure value to the second limit value when the output current is a second current value that is lower than the first current value.

10. The fuel cell system according to claim 8, further comprising:

an atmospheric pressure acquirer configured to obtain a value of atmospheric pressure surrounding the fuel cell system, wherein the controller is configured to correct the first limit value or the second limit value with the obtained value of atmospheric pressure.

11. The fuel cell system according to claim 8, wherein the abnormality of the hydrogen pump is that the hydrogen pump is frozen.

12. The fuel cell system according to claim 11, wherein the abnormality detector includes a temperature gauge configured to measure a temperature of the hydrogen pump.

13. The fuel cell system according to claim 11, wherein the abnormality detector includes a resolver configured to measure a rotation speed of the hydrogen pump.

* * * * *